United States Patent
Kim et al.

(10) Patent No.: US 10,167,385 B2
(45) Date of Patent: Jan. 1, 2019

(54) ACRYLIC PROCESSING AID, METHOD FOR PREPARING THE SAME AND POLYVINYLCHLORIDE RESIN COMPOSITION COMPRISING THE SAME

(71) Applicant: LG Chem, Ltd., Seoul (KR)

(72) Inventors: Yoon Ho Kim, Daejeon (KR); Geon Soo Kim, Daejeon (KR); Chang No Lee, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/429,722

(22) Filed: Feb. 10, 2017

(65) Prior Publication Data

US 2017/0342255 A1     Nov. 30, 2017

(30) Foreign Application Priority Data

May 24, 2016   (KR) ........................ 10-2016-0063181

(51) Int. Cl.
  *C08L 27/06* (2006.01)
  *C08J 9/00* (2006.01)
  *C08J 9/10* (2006.01)

(52) U.S. Cl.
  CPC ............. *C08L 27/06* (2013.01); *C08J 9/0061* (2013.01); *C08J 9/103* (2013.01); C08J 2201/03 (2013.01); C08J 2203/04 (2013.01); C08J 2327/06 (2013.01); C08J 2433/12 (2013.01); C08J 2451/00 (2013.01); C08L 2203/14 (2013.01); C08L 2205/06 (2013.01); C08L 2207/53 (2013.01)

(58) Field of Classification Search
  CPC ...... C08J 9/0061; C08J 9/103; C08J 2433/12; C08J 2451/00; C08J 2327/06; C08J 2203/04; C08J 2201/03; C08L 27/06; C08L 2205/06; C08L 2203/14; C08L 2207/53; B01J 2/006

See application file for complete search history.

(56) References Cited

U.S. PATENT DOCUMENTS

| | | |
|---|---|---|
| 5,093,420 A | 3/1992 | Matsuba et al. |
| 6,221,966 B1 | 4/2001 | Nakanishi et al. |
| 6,391,976 B1 | 5/2002 | Naka et al. |
| 6,723,762 B1 | 4/2004 | Sunagawa et al. |
| 6,730,741 B1* | 5/2004 | Honda et al. ........... C08L 27/06 525/228 |
| 7,432,320 B2 | 10/2008 | Sakashita et al. |
| 2009/0191400 A1* | 7/2009 | Vanrheenen .......... B32B 25/042 428/319.7 |
| 2014/0073713 A1 | 3/2014 | Kim et al. |
| 2014/0187451 A1* | 7/2014 | Tamsilian et al. ..... C09K 8/588 507/213 |
| 2016/0333176 A1 | 11/2016 | Kim et al. |

FOREIGN PATENT DOCUMENTS

| | | |
|---|---|---|
| CN | 102532394 B | 9/2013 |
| EP | 1045004 A1 | 10/2000 |
| JP | H02269755 A | 11/1990 |
| JP | H11166091 A | 6/1999 |
| KR | 100964103 B1 | 6/2010 |
| KR | 20110040510 A | 4/2011 |
| KR | 20130112655 A | 10/2013 |
| KR | 20140108101 A | 9/2014 |
| WO | 00012621 A1 | 3/2000 |

* cited by examiner

*Primary Examiner* — Nathan M Nutter
(74) *Attorney, Agent, or Firm* — Lerner, David, Littenberg, Krumholz & Mentlik, LLP

(57) ABSTRACT

The present invention relates to an acrylic processing aid, a method for preparing the same, and a polyvinyl chloride resin composition comprising the same. More specifically, the present invention relates to an acrylic processing aid having a core-shell structure comprising the core and shell comprise a polymer prepared by copolymerizing a methyl methacrylate monomer and an alkyl acrylate monomer having 1 to 18 carbon atoms, and wherein the core comprises the polymer having a weight-average molecular weight ranging from 10,000,000 to 18,000,000 g/mol, a method for preparing the same, and a polyvinyl chloride resin composition comprising the same.

13 Claims, No Drawings

ACRYLIC PROCESSING AID, METHOD FOR PREPARING THE SAME AND POLYVINYLCHLORIDE RESIN COMPOSITION COMPRISING THE SAME

TECHNICAL FIELD

This application claims the benefit of Korean Patent Application No. 10-2016-0063181 on May 24, 2016 with the Korean Intellectual Property Office, the disclosure of which is herein incorporated by reference in its entirety.

The present invention relates to an acrylic processing aid which exhibits superior aggregation characteristics and improves foam molding properties, a method for preparing the same and a polyvinyl chloride resin composition comprising the same.

BACKGROUND ART

A polyvinyl chloride resin is a homopolymer of vinyl chloride or an interpolymer comprising 50% or more of vinyl chloride. The polyvinyl chloride resin is inexpensive and easy to control hardness and can be applied to various processing processes such as foam molding, extrusion molding, injection molding, calendering, etc. Also, since it provides molded articles with superior physical/chemical properties, it is extensively utilized in various fields.

However, because the polyvinyl chloride resin has disadvantages in terms of impact strength, workability, thermal stability and heat distortion temperature, additives to address these disadvantages are used. For example, additives for the polyvinyl chloride resin such as impact modifiers, processing aids, stabilizers and fillers are suitably selected according to applications thereof.

Recently, interest in foam molding of the polyvinyl chloride resin for miniaturization, reduction in weight, high performance and cost saving of molded articles has increased. However, when the polyvinyl chloride resin is foam-molded alone, there are disadvantages in that sufficient elongation and melt strength cannot be obtained and appearance of molded articles is thus bad. Moreover, foam cells are large and non-uniform and foaming magnitude is thus low.

In order to solve these disadvantages, it is suggested to use a processing aid in combination with a foaming agent in the polyvinyl chloride resin. The processing aid improves inherent melting delay characteristics of the polyvinyl chloride resin, thereby helping to fully exert all mechanical and chemical properties.

Specifically, when the polyvinyl chloride resin is foam-molded, the processing aid helps to sufficiently proceed melting of the vinyl chloride which forms walls of the foam cells so as to increase a high-temperature melt strength and to resist pressure of gas decomposing and expanding at high temperature, thereby preventing the open cell structure, in which the walls of the foam cells bust to be connected to each other, from being formed. The processing aid early breaks boundaries of primary particles, which are basic constituent units, by such an effect during foam molding to promote the uniform molten state on a molecular level, so that the product as the molding completed may result in obtaining a molded article with uniform mechanical and chemical properties.

The processing aid for the polyvinyl chloride resin which is currently commercialized comprises methyl methacrylate alone, which is excellent in compatibility with the polyvinyl chloride resin, as a main monomer. Or it comprises high molecular weight acrylic polymer prepared by copolymerizing methyl methacrylate with a comonomer such as acrylate, methacrylate, a monomer with nitrile unsaturated double bond or a monomer with aromatic unsaturated double bonds through emulsion polymerization.

For example, U.S. Pat. No. 6,221,966 discloses preparation of a processing aid by polymerization of a latex polymerized using alkyl acrylate as a main monomer and methyl methacrylate.

U.S. Pat. No. 6,391,976 discloses that a monomer of methyl methacrylate and butyl methacrylate or polyethyl methacrylate can be used to improve foam molding properties.

Although the acrylic processing aids proposed in these patents have improved foam moldability to a certain extent, their effects are not sufficient. Furthermore, when the acrylic processing aid was used, high melt viscosity increased to lower workability and dispersibility. In order to compensate for this, methods such as using styrene-acrylonitrile copolymer, controlling contents of the comonomer or using separate additives were suggested, but problems such as decrease in foaming efficiency due to change of material quality and increase in cost due to adding additives have rather occurred. Therefore, there is a need for more studies on an acrylic processing aid having excellent aggregation characteristics, foam molding properties and workability in foam molding processes.

PRIOR ART DOCUMENT

Patent Document

U.S. Pat. No. 6,221,966, "Vinyl chloride resin composition"

U.S. Pat. No. 6,391,976, "Processing aid for foam molding use and vinyl chloride resin composition containing the same"

DISCLOSURE

Technical Problem

Therefore, the present invention has been made in view of the above problems, it provides an acrylic processing aid having a core-shell structure, in which the core comprises an ultrahigh molecular weight acrylic polymer having a weight-average molecular weight of 10,000,000 g/mol or more, in order to improve the foaming workability and the moldability as well as to suppress the physical properties deterioration of the polyvinyl chloride resin.

Accordingly, it is an object of the present invention to provide an acrylic processing aid being capable of improving aggregation characteristics and foam molding properties.

In addition, it is another object of the present invention to provide a method for preparing the acrylic processing aid.

It is still another object of the present invention to provide a vinyl chloride resin composition comprising the acrylic processing aid.

Technical Solution

In accordance with one aspect of the present description, there is provided an acrylic processing aid having a core-shell structure comprising:

wherein the core and shell comprise a polymer prepared by copolymerizing a methyl methacrylate monomer and an alkyl acrylate monomer having 1 to 18 carbon atoms, wherein the core comprises the polymer having a weight-average molecular weight ranging from 10,000,000 to 18,000,000 g/mol.

Preferably, the core comprises 70 to 99% by weight of the methyl methacrylate monomer and 1 to 30% by weight of the alkyl acrylate monomer having 1 to 18 carbon atoms, based on a total weight of monomers constituting the core.

Preferably, the shell comprises the polymer having a weight-average molecular weight ranging from 200,000 to 2,000,000 g/mol.

More preferably, the shell comprises 20 to 40% by weight of the methyl methacrylate monomer and 40 to 80% by weight of the alkyl acrylate monomer having 1 to 18 carbon atoms, based on a total weight of monomers constituting the shell.

Further, at least one of the core and shell comprises a vinyl monomer.

Preferably, the acrylic processing aid comprises 75 to 95% by weight of the core and 5 to 25% by weight of the shell, based on a total weight of the acrylic processing aid.

In accordance with another aspect of the present invention, there is provided a method for preparing the acrylic processing aid having a core-shell structure, comprising polymerizing a methyl methacrylate monomer and an alkyl acrylate monomer having 1 to 18 carbon atoms to prepare the core; and polymerizing the core, the methyl methacrylate monomer and the alkyl acrylate monomer having 1 to 18 carbon atoms to prepare the shell.

In accordance with still another aspect of the present invention, there is provided a polyvinyl chloride resin composition comprising the acrylic processing aid described above.

Advantageous Effects

As set forth above, the acrylic processing aid of the core-shell structure according to the present invention in which the core comprises an ultrahigh molecular weight polymer solves not only the problem of lowering foam molding properties and workability caused by generation of an ungelled product by increasing molecular weight of the conventional processing aid, but also provides with excellences in aggregation characteristics.

Therefore, the processing aid of the present invention improves the foaming formability by shortening the melt time, increasing the melt pressure and the extrusion output, lowering the foam specific gravity, to enhance the uniformity of foam pores and to improve the foam moldability. Thus, it is possible to prepare a high quality vinyl chloride resin molded article.

MODE FOR INVENTION

Hereinafter, the present invention will be described in more detail.

An acrylic processing aid is used to improve foam molding properties on foam molding the polyvinyl chloride resin. At this time, as the molecular weight of the processing aid increases, the foaming efficiency can be improved and the viscosity or elasticity of the polyvinyl chloride resin can be reinforced. When a processing aid with high molecular weight is used, ungelled products or unmelted dispersions are prone to occur by difference in fusibility. Also, the melt viscosity is increased to cause problems such as deterioration of foaming performance, dispersibility, transparency and secondary workability and the effect of adding the processing aid is not sufficiently obtained. The prior art used methods such as controlling contents of comonomers or adding crosslinkable monomers to improve this, but the physical property of the polyvinyl chloride resin was lowered and the foam molding property and aggregation characteristics was not also improved at a satisfactory level.

Therefore, in order to inhibit deterioration of the physical properties due to increasing molecular weight of the processing aid and ensure the excellent foaming efficiency, the present invention proposes the acrylic-based processing aid having a core-shell structure comprising a polymer having a specific range of molecular weight, especially an ultrahigh molecular weight in the core.

Specifically, the acrylic processing aid according to the present invention is composed of a core-shell structure, and the core and shell comprise a polymer prepared by copolymerization of a methyl methacrylate monomer and an alkyl acrylate monomer having 1 to 18 carbon atoms. At this time the core comprises a polymer having an ultrahigh molecular weight, specifically a weight-average molecular weight ($M_w$) of at least 10,000,000 g/mol. When the acrylic processing aid of the present invention is added to a polyvinyl chloride resin composition, the foaming efficiency may be improved by the core with ultrahigh molecular weight. In addition, the polyvinyl chloride resin and foam-molded article provide with excellence in workability and mechanical properties.

The acrylic processing aid according to an embodiment of the present invention has a core-shell structure.

In the present invention, the core and shell comprise a polymer prepared by copolymerizing a methyl methacrylate monomer and an alkyl acrylate monomer having 1 to 18 carbon atoms.

The methyl methacrylate monomer is a monomer composed of a basic composition in the acrylic processing aid, which plays a major role as a processing aid.

The alkyl acrylate monomer having 1 to 18 carbon atoms increases compatibility with the vinyl chloride resin due to the presence of a hydrophobic group, and thus serves to improve the foaming moldability. The alkyl acrylate monomer having 1 to 18 carbon atoms comprises at least one selected from the group consisting of methyl acrylate, ethyl acrylate, propyl acrylate, isopropyl acrylate, butyl acrylate, hexyl acrylate, octyl acrylate, lauryl acrylate, stearyl acrylate, 2-ethylhexyl acrylate and cyclohexyl acrylate. Preferably, it may be butyl acrylate.

As the alkyl acrylate monomers having 1 to 18 carbon atoms, the same monomers or the different monomers can be used on preparing the core and shell.

In the present invention, the core comprises the polymer having a weight-average molecular weight ranging from 10,000,000 to 18,000,000 g/mol, preferably 12,000,000 to 16,000,000 g/mol and more preferably 12,000,000 to 15,000,000 g/mol.

In the foaming process, the higher the molecular weight of the processing aid, the more complicated network structure is formed, thereby lowering the foam specific gravity and having uniform pores. The acrylic processing aid of the present invention comprises the core composed of a polymer having an ultrahigh molecular weight, specifically a weight average molecular weight of 10,000,000 g/mol or more, so that the foam molding property can be further enhanced on foam molding the polyvinyl chloride resin. The conventionally used acrylic copolymers have a weight-average molecular weight in a level of 5,000,000 g/mol or less, whereas the core of the present invention has high molecular weight. A problem in workability and dispersibility may be caused because of this, but this may be compensated via the shell described below.

When the weight-average molecular weight is less than the above range, the foam specific gravity increases, so that the desired foam molding property cannot be obtained, and when it is more than the above range, the workability and the dispersibility are inhibited, so that problems in processes of vinyl chloride resins or molded articles may be caused.

The core having the above weight-average molecular weight according to the present invention is polymerized in a content range of 70 to 99% by weight of a methyl methacrylate monomer; and 1 to 30% by weight of an alkyl acrylate monomer having 1 to 18 carbon atoms, based on a total weight of monomers constituting the core. Preferably, the methyl methacrylate monomer may be 75 to 99% by weight, and more preferably 80 to 97% by weight. In addition, the alkyl acrylate monomer having 1 to 18 carbon atoms is preferably 1 to 25% by weight, and more preferably 3 to 20% by weight. When a monomer mixture composed of the above-mentioned content range is used, a polymer having a weight-average molecular weight of 10,000,000 to 18,000,000 g/mol to be intended in the present invention can be embodied, and thus the foaming efficiency can be further improved. When it is out of the above content range, the foam specific gravity increases, so that the foam characteristics may be deteriorated.

In the present invention, the shell comprises the polymer having a weight-average molecular weight ranging from 200,000 to 2,000,000 g/mol, preferably 500,000 to 1,500,000 g/mol, and more preferably 600,000 to 1,200,000 g/mol.

By using the acrylic processing aid comprising the shell composed of a polymer having a weight-average molecular weight in the above range in the polyvinyl chloride resin, it is possible to improve aggregation characteristics and processing characteristics.

The shell having the above weight average molecular weight according to the present invention is polymerized in a content range of 20 to 40% by weight of a methyl methacrylate monomer; and 40 to 80% by weight of an alkyl acrylate monomer having 1 to 18 carbon atoms, based on a total weight of monomers. Preferably, the methyl methacrylate monomer may be 25 to 40% by weight, and more preferably 30 to 40% by weight. In addition, the alkyl acrylate monomer having 1 to 18 carbon atoms is preferably 45 to 75% by weight, and more preferably 50 to 70% by weight. When a monomer mixture composed of the above range is used, a polymer having a weight average molecular weight of 200,000 to 2,000,000 g/mol to be intended in the present invention can be embodied.

In the present invention, the shell comprises a relatively large amount of the alkyl acrylate monomer and it can help to control the glass transition temperature ($T_g$) to represent excellent aggregation characteristics and processing characteristics by using an excess amount of the monomer having a low glass transition temperature ($T_g$). When it is out of the above content range, the workability is lowered, so that a problem in processes may be caused and the quality of the molded product may be poor.

In the present invention, at least one of the core and shell may further comprise a vinyl monomer. Since the vinyl monomer has a high refractive index, the transparency of the polyvinyl chloride resin can be improved. For example, the vinyl monomer comprises at least one selected from the group consisting of styrene, α-methylstyrene, p-methylstyrene, o-ethylstyrene, p-ethylstyrene, vinyltoluene, acrylonitrile, methacrylonitrile and ethacrylonitrile. Preferably, it may be styrene.

The vinyl monomer is comprised in an amount of 0 to 20% by weight, preferably 1 to 10% by weight, based on a total weight of the monomers constituting the core or shell. When the content is less than the above range, the effect of improving the physical properties cannot be expected, and when it is more than the above range, the glass transition temperature ($T_g$) increases, so that problems such as increasing the melting time and increasing the melting pressure may be caused.

The acrylic processing aid according to the present invention may comprise 75 to 95% by weight of the core and 5 to 25% by weight of the shell based on a total weight of the acrylic processing aid. Preferably, the core may be 80 to 95% by weight, and more preferably 80 to 90% by weight. In addition, the shell is preferably 5 to 20% by weight, and more preferably 8 to 18% by weight. When the core and shell are included as described above, it is preferred that the aggregation characteristics of the acrylic processing aid may be not only improved, but also the foam moldability of the polyvinyl chloride resin. Also, it may be reinforced the foam moldability which has been lowered by increasing the cell size due to uneven foaming on foam molding, According to another embodiment of the present invention, provided is a method for preparing the acrylic processing aid.

The acrylic processing aid having the core-shell structure can be prepared through two steps of polymerization.

Specifically, the method for preparing the acrylic processing aid having the core-shell structure comprises steps of: polymerizing a methyl methacrylate monomer and an alkyl acrylate monomer having 1 to 18 carbon atoms to prepare the core; and polymerizing the core, the methyl methacrylate monomer and the alkyl acrylate monomer having 1 to 18 carbon atoms to prepare the shell.

The method for preparing the acrylic processing aid having the core-shell structure according to the present invention may be carried out using polymerization methods commonly known in the art.

Any common polymerization methods such as emulsion polymerization, suspension polymerization or solution polymerization may be used without particular limitation as a polymerization method used in the present invention.

The emulsion polymerization is that a monomer of a certain composition is emulsified into a non-solvent (usually water) with an emulsifier, and then polymerized using a polymerization initiator and an oxidation-reduction catalyst to prepare a polymer. The suspension polymerization is that a monomer of a certain composition is dispersed in a non-solvent (usually water) with a dispersant, and then polymerized using a polymerization initiator and an oxidation-reduction catalyst to prepare a polymer, and the solution polymerization is that unlike the emulsion polymerization or the suspension polymerization, a monomer of a certain composition is dissolved in a solvent and polymerized using a polymerization initiator and an oxidation-reduction catalyst to prepare a polymer. A preferred method of the above polymerization methods may be emulsion polymerization.

Hereinafter, each step will be described in detail below.

In the first step, the methyl methacrylate monomer and the alkyl acrylate monomer having 1 to 18 carbon atoms are mixed and polymerized to prepare the core.

In this step, for example, a polymerization initiator and an emulsifier of commonly known in the art may be further included.

As the polymerization initiator, a water-soluble initiator can be used, which may be, for example, inorganic peroxides such as sodium persulfate, potassium persulfate, ammonium persulfate, potassium perphosphate and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyl peroxide, octanoyl peroxide, dibenzoyl peroxide, 3,5,5-trimethylhexanol peroxide, and t-butyl peroxyisobutyrate; nitrogen compounds such as azobisisobutyronitrile, azobis-2,4-dimethylvaleronitrile, azobiscyclohexanecarbonitrile, and azobisisobutyric acid (butyl acid) methyl. The polymerization initiator is used in an amount of 0.00001 to 0.2 parts by weight, based on 100 parts by weight of the monomer mixture.

The emulsifier may be one or more selected from the group consisting of an anionic emulsifier, a cationic emulsifier and a nonionic emulsifier, without being particularly limited in the present invention. As an example, the emulsifier may be one or more selected from the group consisting of an anionic emulsifier widely used in, generally, the emulsion polymerization such as sulfonates, carboxylic acid slats, succinates, sulfosuccinates, and their metal salts, for example alkylbenzene sulfonic acid, sodium alkylbenzene sulfonate, alkylsulfonic acid, sodium alkylsulfonate, sodium polyoxyethylene nonylphenyl ether sulfonate, sodium stearate, sodium dodecyl sulfate, sodium lauryl sulfate, sodium dodecyl sulfosuccinate, and abietic acid salts; a cationic emulsifier to which an amine halide, an alkyl quaternary ammonium salt, an alkylpyridinium salt or the like is bonded as a functional group of a higher aliphatic hydrocarbon; and a nonionic emulsifier such as polyvinyl alcohol and polyoxyethylene nonylphenyl, without being limited to these emulsifiers. Such an emulsifier may be used in an amount of 0.1 to 5 parts by weight, based on 100 parts by weight of the monomer mixture.

In the present invention, an additive such as a molecular weight modifier, an activator, an oxidation-reduction catalyst, and ionized water, commonly known in the art may be further included on polymerizing them.

The molecular weight modifier is not particularly limited, but may be, for example, mercaptans such as a-methylstyrene dimer, t-dodecyl mercaptan, n-dodecyl mercaptan and octyl mercaptan; halogenated hydrocarbons such as carbon tetrachloride, methylene chloride and methylene bromide; and sulfur compounds such as tetraethylthiuram disulfide, dipentamethylenethiuram disulfide, and diisopropylxantogen disulfide, and may be used in an amount of 0.1 to 3 parts by weight, based on 100 parts by weight of the monomer mixture.

The activator is not limited, but at least one selected from sodium hydrosulfite, sodium formaldehyde sulfoxylate, sodium ethylenediamine tetraacetate, ferrous sulfate, lactose, dextrose, sodium linoleate and sodium sulfate may be used in an amount of 0.01 to 0.15 parts by weight, based on 100 parts by weight of the monomer mixture.

The oxidation-reduction catalyst is not particularly limited, but may be, for example, sodium formaldehyde sulfoxylate, ferrous sulfate, disodium ethylenediamine tetraacetate, and cupric sulfate, and may be used in an amount of 0.01 to 0.1 parts by weight, based on 100 parts by weight of the monomer mixture.

The polymerization may be carried out at 40 to 80° C. for 2 to 12 hours.

Subsequently, in the second step, for preparing the shell, the core, the methyl methacrylate monomer and the alkyl acrylate monomer having 1 to 18 carbon atoms are added thereto and then polymerized to prepare the acrylic processing aid having a core-shell structure.

At this time, in preparing the shell, the composition and reaction conditions necessary for polymerization are performed in the same manner as described above.

In addition, after preparing the acrylic processing aid having the core-shell structure, the method may further comprise a step of aggregating it.

The aggregation can be carried out using an acid, a salt or a polymer by a method commonly used in the art.

In addition, after the aggregation, the acrylic processing aid powder can be prepared using a method for preparing the powder by dehydrating and drying or a spray drying method as methods commonly used in the art.

The acrylic processing aid having the core-shell structure as prepared above may have an average particle diameter ranging from 70 to 250 nm by the aggregation.

According to still another embodiment of the present invention, provided is a polyvinyl chloride resin composition containing the acrylic processing aid.

The acrylic processing aid has a core-shell structure, and in particular, the core comprises the ultrahigh molecular weight polymer having a weight-average molecular weight in a range of 10,000,000 to 18,000,000 g/mol, whereby the foaming efficiency may be not only increased on foam molding the polyvinyl chloride resin, but also the foam specific gravity may be lowered and the pore size may be made small and uniform. In addition, since the shell comprises the polymer having a weight average molecular weight in a range of 200,000 to 2,000,000 g/mol, the processing and dispersion characteristics may be not only improved due to high compatibility with the polyvinyl chloride resin, but also the melting time of the polyvinyl chloride resin may be shortened to minimize generation of ungelled products or unmelted dispersions.

Specifically, the polyvinyl chloride resin composition may comprise 0.1 to 30 parts by weight, preferably 1 to 20 parts by weight, of the acrylic processing aid, based on 100 parts by weight of the polyvinyl chloride resin composition.

When the content of the acrylic processing aid is less than the above range, the workability, moldability and thermal stability by use of the processing aid are so low that the quality of the prepared molded articles is lowered, and when it is also more than the above range, the workability is not only lowered, but also mechanical and chemical properties are lowered, and thus the content is appropriately used within the above range.

Furthermore, various additives commonly used in this field may be further included, if necessary. As the additives, usual additives such as heat stabilizers, lubricants, impact modifiers, plasticizers, UV stabilizers, flame retardants, colorants, fillers, antimicrobials, mold release agents, antioxidants, light stabilizers, compatibilizing agents, dyes, inorganic additives, surfactants, nucleating agents, coupling agents, admixtures, stabilizers, antistatic agents, pigments and flame proofing agents may be added, which may be applied alone or in a mixture of two or more thereof.

The foam molding using the polyvinyl chloride resin composition is not particularly limited in the present invention and follows such a manner that it may easily be carried out by a person with ordinary skill in the art.

The molded articles through foam molding may have improved expansion ratio and stability of foam pores on foam processing to obtain foams having a low specific gravity of 0.3 to 0.4 g/cm$^3$, and have uniform foam pores.

Hereinafter, to help understanding of the present invention preferred examples are set forth, but it is apparent to those skilled in the art that the following examples illustrate only the present invention and various alterations and modifications can be made within categories and technical idea scopes of the present invention, and it should be realized that such alterations and modifications belong to the appended claims.

Example 1

(1) Step 1: Preparation of Core

A four-neck flask equipped with a stirrer, a thermometer, a nitrogen inlet, and a circulating condenser was prepared, to which 70 parts by weight of deionized water, 0.002 parts by weight of ferrous sulfate and 0.04 parts by weight of disodium ethylenediamine tetraacetate were introduced, with maintaining the internal temperature of the reactor at 40° C. under a nitrogen atmosphere.

Separately from the reactor, a monomeric pre-emulsion was prepared by mixing 60 parts by weight of ionized water, 1.0 part by weight of sodium dodecyl benzene sulfonate, methyl methacrylate and butyl acrylate. At this time, methyl methacrylate and butyl acrylate were added at a weight ratio of 94.1:5.9.

When the internal temperature of the reactor reached 40° C., 50 parts by weight of the monomeric pre-emulsion, 0.0002 parts by weight of t-butyl hydroperoxide and 0.03 parts by weight of sodium formaldehyde sulfoxylate were simultaneously introduced to the reactor and a first polymerization was carried out for 3 hours to prepare core.

(2) Step 2: Preparation of Acrylic Processing Aid Having Core-Shell Structure

After mixing methyl methacrylate, butyl acrylate, and 0.2 parts by weight of sodium dodecyl benzene sulfonate in the core prepared in Step 1 above, the resulting mixture was polymerized. At this time, methyl methacrylate and butyl acrylate were introduced in a weight ratio of 33:67, and the content of the core prepared in Step 1 above is describe in Table 1 below.

When the internal temperature of the reactor reached 45° C., 0.01 parts by weight of t-butyl hydroperoxide and 0.004 parts by weight of sodium formaldehyde sulfoxylate were introduced, and then the reaction was conducted for 3 hours to prepare an acrylic processing aid comprising the core in Step 1 above; and shell on the core.

(3) Preparation of Acrylic Processing Aid Powder

The core-shell acrylic processing aid prepared in Step 2 above was diluted to be 15% by weight based on the solid content and put into a flocculation tank, the internal temperature of which was raised to 70° C. The core-shell acrylic processing aid was aggregated by introducing a calcium chloride solution (10% by weight) thereto at once relative to 100 parts by weight of the core-shell acrylic processing aid based on the solid content to obtain a slurry, which was then washed with ion-exchanged water 2 to 3 times to wash off by-products, and then a large amount of water was removed through filtration. Subsequently, a powdery sample was obtained by drying it at 80° C. for 3 hours using a small fluidized-bed dryer used for laboratory use.

Example 2

The same steps as Example 1 above were carried out except that t-butyl hydroperoxide was added in an amount of 0.0001 parts by weight on proceeding Step 1 and in an amount of 0.01 parts by weight on proceeding Step 2.

Example 3

The same steps as Example 1 above were carried out except that methyl methacrylate and butyl acrylate were used at a weight ratio of 94.4:5.6 on proceeding Step 1, methyl methacrylate and butyl acrylate were added at a weight ratio of 40:60 on proceeding Step 2 and the ratio of core:shell was controlled to 90:10.

Comparative Example 1

The same steps as Example 1 above were carried out except that methyl methacrylate and butyl acrylate were polymerized at a weight ratio of 94.1:5.9 in Step 1 and methyl methacrylate and butyl acrylate were polymerized at a weight ratio of 33:67 in Step 2, and the resulting latexes were each mixed at a weight ratio of 85:15 and used.

Comparative Example 2

The same steps as Example 1 above were carried out except that methyl methacrylate and butyl acrylate were used at a weight ratio of 93.8:6.2 on proceeding Step 1, and the ratio of core:shell was controlled to 97:3 on proceeding Step 2.

Comparative Example 3

The same steps as Example 1 above were carried out except that methyl methacrylate and butyl acrylate were used at a weight ratio of 94.3:5.7 on proceeding Step 1, and the ratio of core:shell was controlled to 70:30 on proceeding Step 2.

Comparative Example 4

The same steps as Example 1 above were carried out except that t-butyl hydroperoxide was added in an amount of 0.0002 parts by weight on proceeding Step 1 and in an amount of 0.001 parts by weight on proceeding Step 2.

Comparative Example 5

The same steps as Example 1 above were carried out except that t-butyl hydroperoxide was added in an amount of 0.001 parts by weight on proceeding Step 1 and in an amount of 0.01 parts by weight on proceeding Step 2.

Experimental Example 1: Measurement of Weight-Average Molecular Weight

The polymers, which constitute the core and shell, prepared in Steps 1 and 2 of the above Examples and Comparative Examples were dried at room temperature to measure their weight average molecular weights with gel permeation chromatography (GPC) after dissolving 0.03 g of solid contents in 10 ml of tetrahydrofuran (THF) for 24 hours, and the obtained results are shown in Table 1 below.

TABLE 1

| | Core Composition (% by weight) | Shell Composition (% by weight) | Ratio of Core:Shell (Weight ratio) | Weight Average Molecular Weight (Ten thousand) | |
|---|---|---|---|---|---|
| | MMA[1]:BA[2] | MMA[1]:BA[2] | | Core | Shell |
| Example 1 | 94.1:5.9 | 33:67 | 85:15 | 1200 | 80 |
| Example 2 | 94.1:5.9 | 33:67 | 85:15 | 1500 | 90 |
| Example 3 | 94.4:5.6 | 40:60 | 90:10 | 1200 | 110 |

TABLE 1-continued

|  | Core Composition (% by weight) | Shell Composition (% by weight) | Ratio of Core:Shell (Weight ratio) | Weight Average Molecular Weight (Ten thousand) | |
|---|---|---|---|---|---|
|  | MMA[1]:BA[2] | MMA[1]:BA[2] |  | Core | Shell |
| Comparative Example 1 | 94.1:5.9 | 33:67 | Simple mixing | 1200 | 100 |
| Comparative Example 2 | 93.8:6.2 | 33:67 | 97:3 | 1200 | 100 |
| Comparative Example 3 | 94.3:5.7 | 33:67 | 70:30 | 1200 | 60 |
| Comparative Example 4 | 94.1:5.9 | 33:67 | 85:15 | 1200 | 300 |
| Comparative Example 5 | 94.1:5.9 | 33:67 | 85:15 | 550 | 70 |

[1]MMA: methyl methacrylate
[2]BA: butyl acrylate

Experimental Example 2: Foam Molding Property (1) Measurement of Aggregation Temperature The acrylic processing aids obtained in the above Examples and Comparative Examples were passed through a mesh having a mesh size of 200 (sieve size 0.075 mm) and the temperatures when the content of the passing materials was 20% or less were measured. The results obtained were shown in Table 2 below.

(2) Measurement of Foam Molding Property

To 100 parts by weight of a vinyl chloride resin (LS 080, manufactured by LG Chem, Ltd.), 1.5 parts by weight of a heat stabilizer OT-700R (Songwon Industrial Co., Ltd., tin-based heat stabilizer), 0.8 parts by weight of a lubricant G-16 (Loxiol), and 0.5 parts by weight of G-70S (Loxiol) were added, to which 5 parts by weight of an acrylic processing aid (powder) of Examples or Comparative Examples and 0.8 parts by weight of a foaming agent azodicarbonamide were added, and the mixture was mixed using a Henschel mixer, with rising temperature to 115° C., to prepare a vinyl chloride resin composition.

The prepared vinyl chloride resin composition was foam molded using a Haake twin extruder with a slit die size of 2 mm (thickness)×30 mm (width) at a cylinder temperature of 180° C. and a screw speed of 30 rpm for 1 minute to measure torques, melt pressures and extrusion outputs during the process.

In addition to this, the specimen obtained through the above foam molding was cut to a length of 30 mm, and the foam specific gravity was measured using a plastic specific gravity measuring machine. The results obtained were shown in Table 2 below.

TABLE 2

|  | Aggregation temperature (° C.) | Torque (%) | Melt pressure (bar) | Extrusion output (g/min) | Foam specific gravity (g/cc) |
|---|---|---|---|---|---|
| Example 1 | 73 | 104 | 118 | 58.2 | 0.376 |
| Example 2 | 74 | 108 | 121 | 58.0 | 0.373 |
| Example 3 | 82 | 107 | 125 | 56.4 | 0.370 |
| Comparative Example 1 | — | 95 | 107 | 52.5 | 0.613 |
| Comparative Example 2 | 98 | 102 | 108 | 52.3 | 0.527 |
| Comparative Example 3 | 68 | 101 | 110 | 51.5 | 0.504 |
| Comparative Example 4 | 75 | 95 | 110 | 57.0 | 0.512 |
| Comparative Example 5 | 70 | 101 | 109 | 54.0 | 0.480 |

As shown in Table 2 above, the acrylic processing aid disclosed in the present invention, since the powdery polymer is easily formed even at a temperature of 85° C. or less and the processing is also promoted on foam extrusion processing, the extrusion output is high and the foam specific gravity is low, so that it can be seen that the foam molding properties are excellent.

In comparison, in the case of simply mixing without forming the core-shell structure as in Comparative Example 1, it was confirmed that there was a problem that the foam specific gravity was high and the extrusion output was low.

In addition, in view of the foam molding properties, the processing aids of Examples 1 to 3 according to the present invention, the melting pressure increased and the foam specific gravity decreased, with confirming that it could have the foam workability and moldability.

However, in the case of Comparative Examples 2 and 3 having different core:shell ratios, it was confirmed that the foam specific gravity increased as well as the melt pressure and the extrusion output decreased.

In addition, in the case of Comparative Example 4 using a high molecular weight polymer in the shell and Comparative Example 5 using a low molecular weight polymer in the core, it was confirmed that the overall foaming properties such as torque, melt pressure, extrusion output, and foam specific gravity were lowered.

INDUSTRIAL APPLICABILITY

The acrylic processing aid of the present invention is used as a processing aid on preparing various molded articles with the vinyl chloride resin, and thus it is possible to prepare molded articles having excellent physical properties.

The invention claimed is:

1. An acrylic processing aid having a core-shell structure:
wherein both the core and shell comprise a polymer prepared by copolymerizing a methyl methacrylate monomer and an alkyl acrylate monomer having 1 to 18 carbon atoms,
wherein the core comprises the polymer having a weight-average molecular weight ranging from 10,000,000 to 18,000,000 g/mol.

2. The acrylic processing aid according to claim 1, wherein the core comprises 70 to 99% by weight of the methyl methacrylate monomer and 1 to 30% by weight of the alkyl acrylate monomer having 1 to 18 carbon atoms, based on a total weight of the monomers constituting the core.

3. The acrylic processing aid according to claim 1, wherein the shell comprises the polymer having a weight-average molecular weight ranging from 200,000 to 2,000,000 g/mol.

4. The acrylic processing aid according to claim 1, wherein the shell comprises 20 to 40% by weight of the methyl methacrylate monomer and 40 to 80% by weight of the alkyl acrylate monomer having 1 to 18 carbon atoms, based on a total weight of the monomers constituting the shell.

5. The acrylic processing aid according to claim 1, wherein the alkyl acrylate monomer having 1 to 18 carbon atoms comprises at least one selected from the group consisting of methyl acrylate, ethyl acrylate, propyl acrylate, isopropyl acrylate, butyl acrylate, hexyl acrylate, octyl acrylate, lauryl acrylate, stearyl acrylate, 2-ethylhexyl acrylate and cyclohexyl acrylate.

6. The acrylic processing aid according to claim 1, wherein at least one of the core and shell further comprises a vinyl monomer.

7. The acrylic processing aid according to claim 6, wherein the vinyl monomer comprises at least one selected from the group consisting of styrene, α-methylstyrene, p-methylstyrene, o-ethylstyrene, p-ethylstyrene, vinyltoluene, acrylonitrile, methacrylonitrile and ethacrylonitrile.

8. The acrylic processing aid according to claim 6, wherein the vinyl monomer is comprised in an amount of 0 to 20% by weight, based on a total weight of the monomers constituting the core or shell.

9. The acrylic processing aid according to claim 1, wherein the acrylic processing aid comprises 75 to 95% by weight of the core and 5 to 25% by weight of the shell, based on a total weight of the acrylic processing aid.

10. The acrylic processing aid according to claim 1, wherein the acrylic processing aid has an average particle diameter ranging from 70 to 250 nm.

11. A method for preparing the acrylic processing aid having the core-shell structure as claimed in claim 1 comprising:
polymerizing a methyl methacrylate monomer and an alkyl acrylate monomer having 1 to 18 carbon atoms to prepare the core; and
polymerizing the core, the methyl methacrylate monomer and the alkyl acrylate monomer having 1 to 18 carbon atoms to prepare the shell.

12. A polyvinyl chloride resin composition comprising the acrylic processing aid as claimed in claim 1.

13. The polyvinyl chloride resin composition according to claim 12, wherein the acrylic processing aid is comprised in an amount of 0.1 to 30 parts by weight, based on 100 parts by weight of the polyvinyl chloride resin composition.

* * * * *